United States Patent
Morishita

[15] 3,670,985
[45] June 20, 1972

[54] FISHING REEL
[72] Inventor: Yasomatsu Morishita, Kure, Japan
[73] Assignee: Kabushiki Kaisha Ryobi Seisakusho, Hiroshima-ken, Japan
[22] Filed: July 10, 1970
[21] Appl. No.: 53,950

[30] Foreign Application Priority Data

July 16, 1969  Japan....................................44/68135
July 21, 1969  Japan....................................44/69170
Aug. 2, 1969   Japan....................................44/73465

[52] U.S. Cl.....................242/84.43, 242/84.52 A, 242/221
[51] Int. Cl.....................................A01k 89/02, A01k 89/04
[58] Field of Search................242/84.52 A, 84.52 R, 84.4, 242/84.43, 84.53, 221

[56] References Cited

UNITED STATES PATENTS

| | | | |
|---|---|---|---|
| 1,575,619 | 3/1926 | Catucci | 242/84.43 UX |
| 1,892,541 | 12/1932 | Smelser | 242/84.52 A |
| 2,374,551 | 4/1945 | Margis, Jr. | 242/84.52 A |

Primary Examiner—Billy S. Taylor
Attorney—Browdy and Neimark

[57] ABSTRACT

A fishing reel having side plates connected in spacer relation by stems to define a frame for a rotatable spool. A clutch lever on one plate is selectively pivoted to declutch the spool from its crank operated drive. A pair of levers are pivotally mounted intermediate their ends on a rear one of said stems. The forward ends of the levers are connected by a reversely threaded roller means. During winding, a line guiding wheel on the roller has a follower in the roller threads and is caused by the line to rotate and thereby reciprocate the guide wheel along the roller to evenly distribute line on the spool. The rear ends of said levers carry brake shoes. The intermediate portions of the levers are connected by a sleeve having a thumb lever portion depressable against a light spring bias to engage the brake shoes on the lever with the spool to retard rotation of same. To cast, the clutch is disengaged permitting free rotation of the spool while tension in the unwinding line lifts the brake shoe free of the spool until slackness occurs in the line allowing the brake to reengage the spool to prevent undesired overrunning.

4 Claims, 12 Drawing Figures

PATENTED JUN 20 1972 3,670,985

Inventor
Yasomatsu Morishita
By Browdy and Neimark
Attorneys

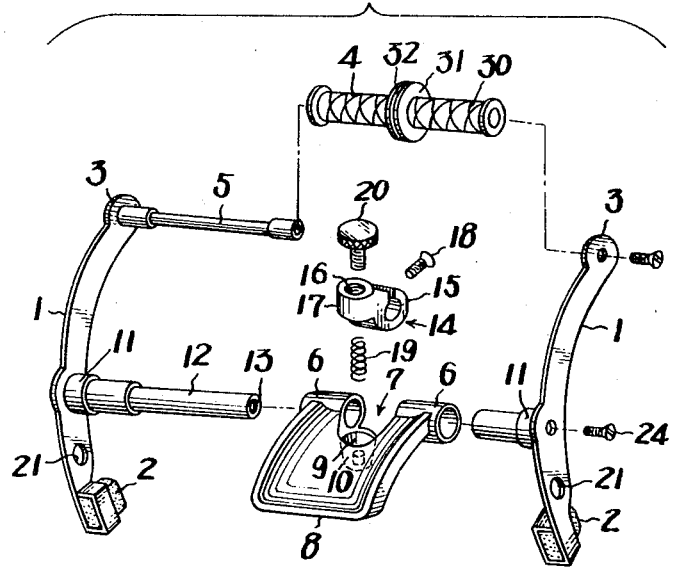
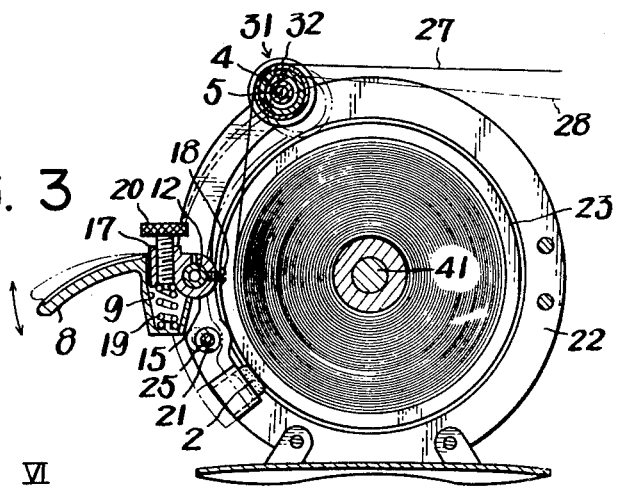
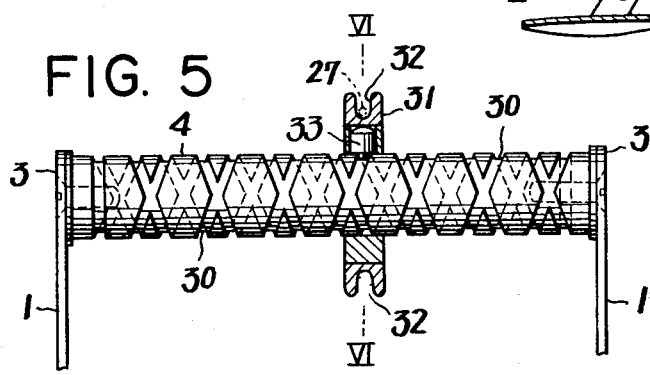

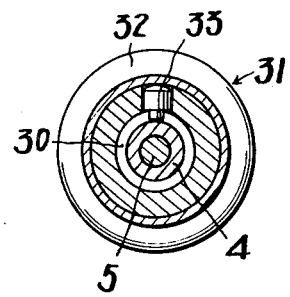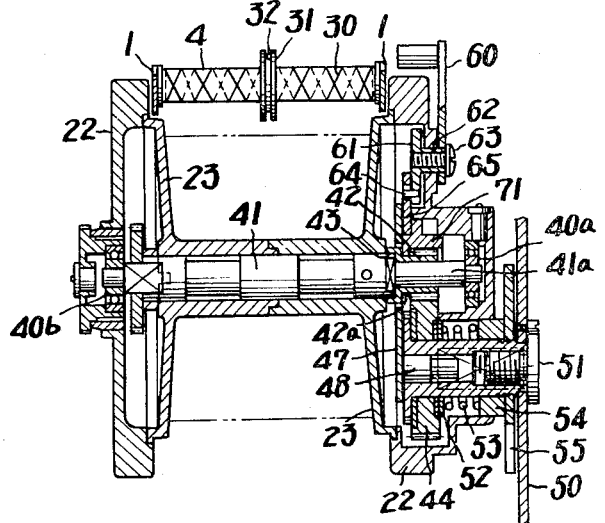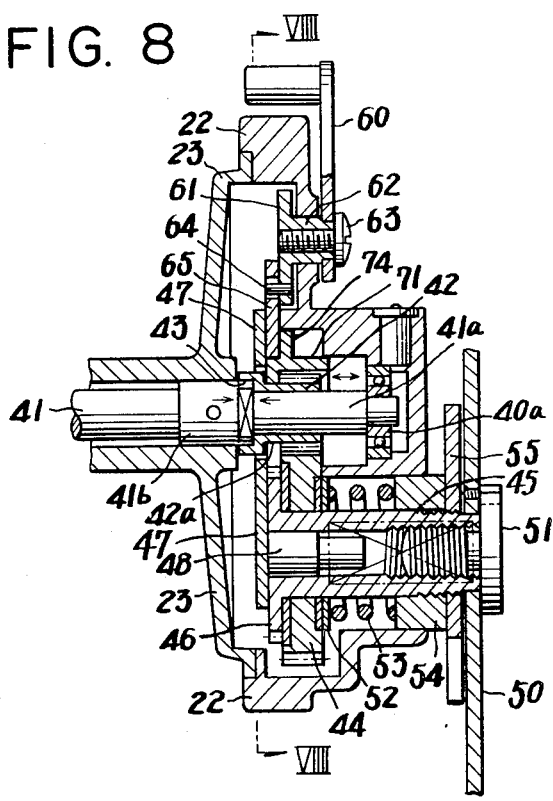

FISHING REEL

An object of the invention is to provide improved antibacklash means for braking automatically a rotating spool as soon as the fishing line hits the water so as to slack.

Another object of the invention is to provide antibacklash means which is readily applicable to standard reels, and strong and sturdy in use.

A further object of the invention is to provide improved traversing means which is light in weight and yet reliable in operation without complicated mechanism as in conventional traversing devices.

A still further object of the invention is to provide improved clutch means which is reliable in operation and sturdy in use.

In the drawings:

FIG. 3 is a cross-sectional view taken along the line III — III of FIG. 2, looking in the direction indicated by the arrows;

FIG. 4 is an exploded perspective view of the antibacklash device;

FIG. 5 is an enlarged elevational view of the transversing device, showing parts broken away;

FIG. 6 is a cross-sectional view taken along the line VI — VI of FIG. 5;

FIG. 7 is a longitudinal sectional view of the reel according to the present invention;

FIG. 8 is an enlarged view of details shown in FIG. 7;

Figure 1:
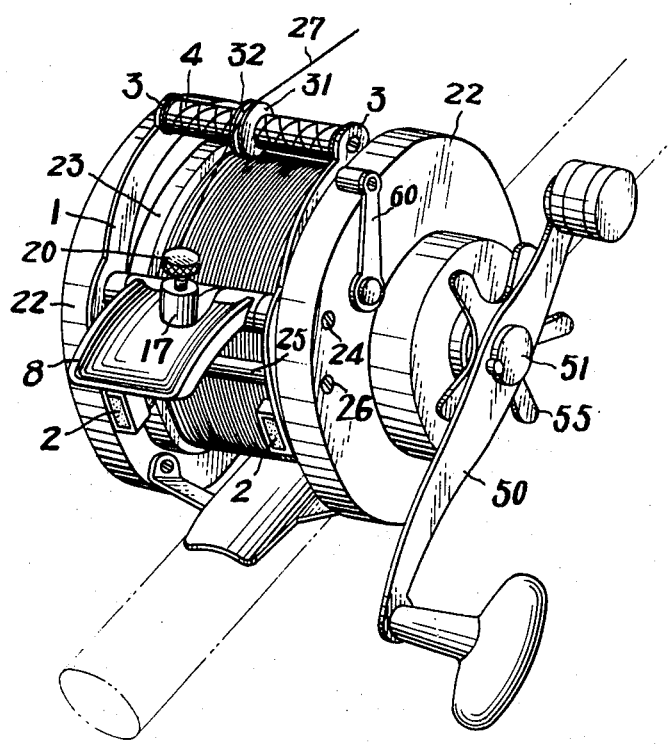
FIG. 1 is a perspective view of a reel according to the present invention.
Figure 2:
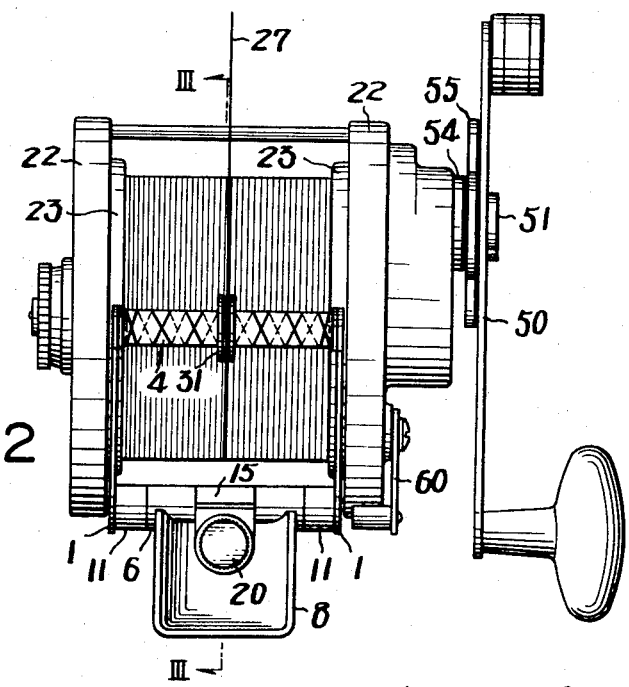
FIG. 2 is a plan view thereof.

Firstly, the antibacklash device according to the present invention will be explained.

As best seen in FIG. 4, numerals 1, 1 indicate a pair of arcuate braking levers each of which is provided with a brake shoe at one end. A rotatable roller 4 is rotatably mounted between other ends 3, 3 of the respective levers. The rotatable roller 4 is conveniently in tubular form which is loosely fitted over a stem 5.

Between the intermediate portions of the brake levers 1, 1 is interconnected a sleeve 6. This sleeve has a notch 7 at its central portion as well as a depressing lever 8 extending laterally therefrom. The notch 7 divides the sleeves 6 into two left and right hand portions and cuts into the depressing lever 8. Below this cut portion 9 of the depressisg lever is provided a spring-receiving recess 10. In the embodiment shown in FIG. 3, the sleeves 6 are integral with the depressing lever 8 and fixedly fitted over tubes 11, 11 protruding from the inside of the respective brake levers 1, 1. It may, however, be not necessarily constructed in such a manner. In this manner, a braking member is normally constructed.

A stem 12 is loosely fitted into the sleeve 6 with its ends having threaded holes 13, 13 into which screws 24 are bolted from outer surfaces of side plates 22 of the reel to attach fixedly the stem to the side plates. A fixed piece 14 is positioned in the notch 17 of the sleeve 6 to be supported in place together with the sleeve 6 by the stem 12 when it is inserted into the sleeve 6. The fixed piece 14 is fastened to the stem 12 by screw 18 and has a protrusion 17 extending laterally from the tubular portion 15 which protrusion has a threaded hole 16. A coiled compression spring 19 is received in the spring-receiving recess 10 with its upper end being engaged by the lower surface of the protrusion 17. When a screw 20 is screwed into the threaded hole 16, the compression spring 19 is compressed toward the recess 10 by the lower end of the screw 20 to cause the braking member to pivot about the stem 12 and to urge the brake shoes 2, 2 on the brake levers 1, 1 against the end edges of rotating plates in the spool 23 of the reel. The screw 20 can adjust the spring force of the spring 10 by changing the screwed depth thereof. Further, each brake lever 1 is provided with a through aperture 21 to prevent a connecting rod 25 between the side plates 22 of the reel from interfering with operating of the brake lever.

The stem 12 passing through the fixed piece 14 and the braking member is fixed between the side plates 22 of the reel by the screws 24 so that each brake lever 1 is positioned on and spaced apart from each end edges of the rotating plates 23 of the spool with suitable gaps and located inwardly of the side plates 22 of the reel. The rod 25 also is fixed to the side plates 22 by screws 26 with its both ends passing through the through apertures 21 in the braking levers 1.

In the above arrangement, the brake shoes 2 are normally urged against the end edges of the rotating plates of the spool 23 to arrest the rotation thereof. When the fishing line 27 passing on the roller 4, as shown by a dotted line 28 in FIG. 3, is pulled down strongly by the flying of sinker, the roller 4 is depressed so that the braking member is pivoted about the stem 12 to disengage the brake shoes 2 on the other ends of the brake levers 1 out of the rotating plates of the spool 23. When the line 27 is slacked by the water-hit of the sinker, the brake member is pivoted by the action of the spring 19 in the opposite direction to cause the brake shoes 2 to arrest the rotation of the spool 23. When it is desired to stop further flying of the sinker, the depressing lever 8 may be slightly forced downwardly to contact the brake shoes 2 with the rotating plates of the spool 23 to control the rotation thereof.

Secondly, the traversing device will be explained.

The roller 4 serves as a fixed cylindrical cam which is positioned between the side plates 22 of the reel and has at its surface a continuous groove 30 of right and left-hand helixes. Onto the cam 4 is rotatably fitted a wheel 31 having a peripheral groove 32. A guide 33 is located between the wheel 31 and the surface of the cam 4. This guide 33 is slidable within the continuous groove 30.

When a handle is rotated in the reeling direction, the fishing line 27 is forced against the bottom surface of the groove 32 of the wheel 31 by drawing force of the fish so that the wheel 31 is rotated with reeling of the line 27 by the friction therebetween. At this time, the wheel 31 slides leftward or rightward on the cam 4 as the guide 33 moves along the continuous groove 30. Therefore, the fishing line 27 can be evenly reeled on the spool 23 of the reel. In order to enhance the friction between the bottom surface of the peripheral groove 32 and the fishing line 27, leather may be conveniently bonded on the bottom surface of the groove 32.

Although the cylindrical cam 4 may be directly attached at its both ends to the side plates of the reel, it is possible to enhance further the function of the reel if the cam is attached between the ends 3 of the brake levers 1.

Thirdly, the clutch will be explained in connection with the basic construction of the reel.

On the central portion of each of the side plates 22 of the reel is mounted a bearing 40a, 40b respectively in which a main shaft 41 is rotatably supported at each end. The shaft 41 is fixed to the spool 23 and has a reduced end portion 41a which is located between the bearing 40a and the spool 23. A pinion 42 is rotatably mounted around the end portion 41a. An engagement 43 is formed between the side of the larger portion 41b adjacent to the reduced end portion 41a and the side of the pinion 42 adjacent the larger portion 41b. Therefore, when the pinion 42, as described later, is moved rightward looking in FIGS. 7 and 8, the engagement 43 is inoperative and only the pinion 42 rotates. On the contrary, when the pinion 42 is moved leftward and the engagement 43 is operative, the pinion 42 is rotated together with the main shaft 41.

Figure 9:
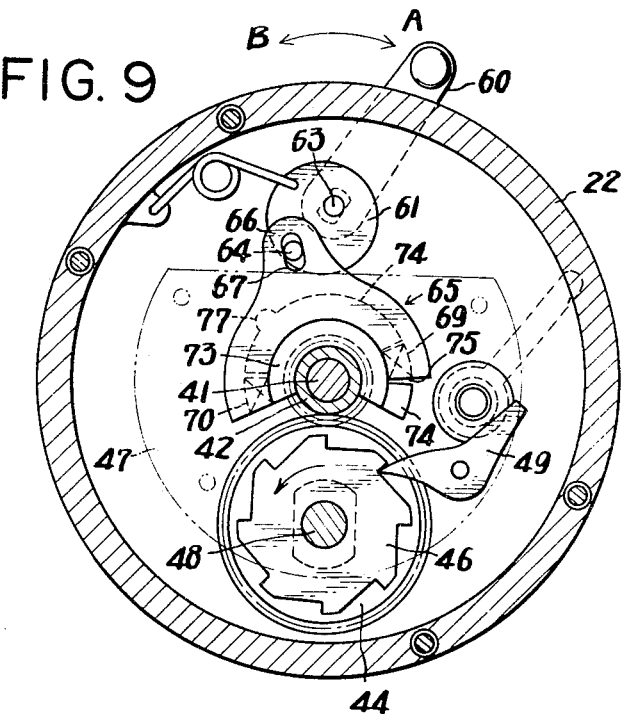
FIG. 9 is a cross-sectional view taken along the line IX — IX of FIG. 8, looking in the direction indicated by the arrows.

The pinion 42 is engaged by a main gear 44 which is loosely mounted on a ratchet shaft 45 which in turn is loosely mounted on a supporting rod 48 of a fixed plate 47 attached to the inner surface of one of the reel side plates 22. The ratchet shaft 45 is provided with a ratchet 46 adjacent to the fixed plate 47. The ratchet 46 is engaged by a pawl 49 for preventing the reversing rotation as shown in FIG. 9. The handle 50 is fixed to the opposite end of the ratchet shaft 44 by stop screw 51. On the ratchet shaft portion between the main gear 44 and the handle 50 are loosely mounted a washer 52, a compression spring 53 and a spring seat 54 in sequence from the main gear 44. A clamping handle 55 is screwed on to the ratchet shaft 45. Therefore, when the clamp handle 55 is tightened manually, the main gear 44 is clamped to the ratchet 46 to rotate together with the ratchet shaft 45. When the handle 55 is loosened manually, the force to the washer 52 is released so that the rotation of the handle 50 is not transmitted to the main gear 44 through the ratchet shaft 45.

In the above arrangement, when the clamping handle 55 is tightened and the handle 50 is rotated manually, the main gear 44 is rotated by the ratchet shaft 45 thereby the pinion 42 engaging with the main gear rotates the main shaft 41 and hence the spool 23 fixed thereto. As a result the fishing line 27 is reeled on the spool 23.

According to the invention, the connecting and disconnecting of the engagement 43 between the pinion 42 and the larger portion 41b of the main shaft 44 in the above construction, can more easily be effected.

In FIG. 9, when clutch lever 60 is moved in the direction of arrow A, that is, in the illustrated position, the engagement 43 is in a position illustrated in FIG. 8 and the pinion 42 is connected with the main shaft 41. When the clutch lever 60 is rotated in the direction of arrow B, the pinion 42 is forced out to the bearing 40a and thus the engagement 43 is disconnected. Therefore, the spool 23 and the main shaft 41 can be freely rotated independently of the pinion 42.

Figure 10:
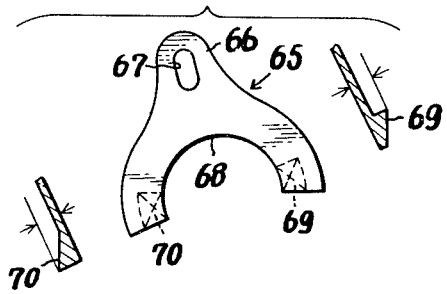
FIG. 10 is an illustrative view of the clutch cam.

The clutch device according to the invention can operate the reel in the aforementioned mode. It will be explained as follows. An eccentric cam 61 has a stem portion 62 passing through one of the side plates 22 onto the outer end of which portion the clutch lever 60 is fixed at its one end by stop screw 63. The eccentric cam 61 is positioned inwardly of the inner surface of said side plate 22 of the reel and has a pin 64 protruding therefrom. This pin 64 is fitted in an elongated slot 67 formed in an arm portion 66 of a clutch cam body 65. It will be best seen in FIG. 10 that the clutch cam body 65 has an inner end surface 68 with the concave in half-circular form, and is respectively formed cams 69, 70 at each end. The cams 69, 70 have surfaces sloped in the directions opposite each other. As shown in FIG. 10, the surface of right cam 69 ascends upwardly and the surface of left cam 70 descends upwardly.

Figure 12:
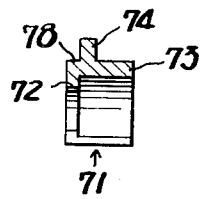
FIG. 12 is a longitudinal sectional view of the clutch plate.
Figure 11:
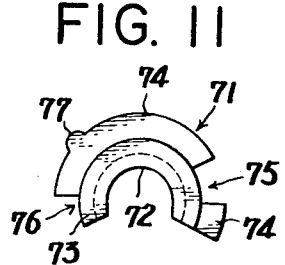
FIG. 11 is an elevational view of the clutch plate.

The clutch cam body 65 is rided over a clutch plate 71 with its concave inner end surface 68. The clutch plate 71, as shown in FIGS. 11 and 12, is in the form of a part-notched cylindrical body, and comprises an inwardly directed flange 72 fitted in a peripheral groove 42a provided on the outer surface of the pinion 42, a cylindrical portion 73 having inner diameter larger than the addendum circle of the pinion 42 and an outwardly directed flange 74 formed on the outer circumference of the cylindrical body 73. The flange 74 has two spaces 75, 76 at both ends in symmetrical position in each of which spaces the respective cam 69, 70 of the clutch cam body is fitted. The flange 74 also has a stop 77 protruding upwardly therefrom. The stop 77 is fitted in a groove (not shown) formed on the inner periphery of said one of the side plate 22 of the reel to arrest the rotation of the clutch plate 71. In front of the inwardly directed flange 74 is formed a rest portion 78 for supporting the concave surface 68 of the clutch cam body 65.

It will be understood from FIG. 8 that the clutch cam body 65 is positioned between the flange 74 of the clutch plate and the fixed plate 47 with its concave inner surface 68 riding over the rest portion 78. When the clutch lever 60 is turned in the direction of arrow B in FIG. 9, the clutch cam body 65 is pivoted by the pin 64 of the eccentric cam 61 and thus the cams 69, 70 thereof forcedly cause the flange 74 of the clutch plate 71 to slide rightwardly in FIG. 8. The pinion 42 being engaged by the flange 72 of the clutch plate 71 also is forcedly slided to the right hand and at this time the engagement 43 between the pinion 42 and the main shaft 41 is disconnected.

When the clutch lever 60 is turned in the direction of arrow A in FIG. 9, the cam body 65 is pivoted at a position illustrated in FIG. 9. Under this condition of the cam body 65, when the handle 50 is rotated manually, the pinion 42 is forced to the right hand in FIG. 8 together with the clutch plate 71 by the gearing rotation between the pinion 42 and the main 44 which both are helical gears. As a result the engagement 43 is connected and the cams 69 and 70 are positioned in the spaces 75, 76 of the clutch plate 71.

Although the reel according to the present invention may include all of the above-mentioned devices, each device can be used independently. The antibacklash device prevents automatically and positively the backlash of the reel. The traversing device has no gear train since the cylindrical cam remains to be fixed and thus need not to be rotated by the rotation of the reeling handle through gear train as have been done hitherto. Therefore, light traversing device can be obtained. The clutch device is more simple in construction and unforcible in mechanism and reliable in operation and sturdy in use. The reel itself according to the present invention therefore is light in weight and simple, easy and sturdy in use.

I claim:

1. A fishing reel comprising a pair of side plates 22, 22 having bearings 40a, 40b mounted on their central portions, a main shaft 41 supported at its ends by said bearings and having a spool 23 fitted onto an intermediate part thereof, a rotation transmitting mechanism for imparting a rotational force from a rotating handle 50 to a pinion 42 loose fitted onto said main shaft, a clutch mechanism for moving said pinion 42 in a pushing mode toward the left side or the right side to cause said pinion to be coupled with or decoupled from said main shaft 41, an antibacklash device including a pair of arcuate brake levers 1, 1, brake shoes 2, 2 provided at the lower ends of said brake levers, a roller 4 bridged between the upper ends of said brake levers and a sleeve 6 interconnecting the intermediate portions of said brake levers and loose fitted onto a stem 12 bridged between said side plates 22, 22, and a traversing device including a wheel 31 rotatably mounted on said roller 4 fixed between said side plates 22, 22, said wheel 31 being adapted to slide forward or rightward in the axial direction of said roller 4 when continuously rotated.

2. A fishing reel as claimed in claim 1 wherein said antibacklash device further includes a notched portion 7 provided at a central portion of the sleeve 6, a depressing lever 8 provided on the sleeve so as to project outwardly of one side of the sleeve, a fixed piece 14 attached fixedly to the stem 12 in said notched portion 7, and a compression spring 19 located between said fixed piece 14 and a spring-receiving recess 10 provided in a cut portion of said depressing lever 8, whereby the resiliency of the compression spring enables the brake shoes 2, 2 to be urged against the rotating plates of the spool, and the brake levers 1, 1 can be swung about the stem 12 against resiliency of the compression spring 13 to cause the brake shoes 2, 2 to go away from the rotating plates of the spool when the roller 4 bridged between the upper ends of the brake levers 1, 1 is pushed toward the spool 23.

3. A fishing reel as claimed in claim 1 wherein said traversing device further includes a continuous groove 30 of right and left helixes on the surface of the roller 4, a guide 33 provided on the wheel 31 so as to project from the inner peripheral surface of the roller passing through opening of the wheel, and a groove 32 provided on the outer peripheral surface of the wheel 31, said guide 33 being adapted to engage with said continuous groove 30 whereby the wheel 31 is rotatably slidable leftward and rightward along said continuous groove 30.

4. A fishing reel as claimed in claim 1 wherein said clutch mechanism includes a clutch plate 71 having an outwardly directed flange 74 formed with spaces 75, 76 and an inwardly directed flange 72 fitted in a groove 42a on a peripheral portion of the pinion 42 so that the clutch plate can be axially moved together with the pinion 42, and a clutch cam 65 having cams 69, 70 fitted in said spaces 75, 76 and an arm portion 66 formed with an elongated slot 67 for receiving a pin 64 of an eccentric cam 61 operated by means of a clutch lever 60, said clutch cam 65 being located between said clutch plate 71 and a fixed plate 47, whereby when rotational displacement is imparted to said clutch cam 65 by means of the clutch lever 60 said cams 69, 70 are moved in and out of the spaces 75, 76 to impart longitudinal displacements to the clutch plate 71 thereby to effect engagement and disengagement of the clutch mechanism.

* * * * *